(12) United States Patent
Lin et al.

(10) Patent No.: US 9,804,259 B2
(45) Date of Patent: Oct. 31, 2017

(54) METHOD FOR MEASURING DISTANCE AND AREAS BY MOBILE DEVICES COMBINED WITH LIGHT BEAM PROJECTORS

(71) Applicant: CONARY ENTERPRISE CO., LTD., Taipei (TW)

(72) Inventors: Wen-Wei Lin, Taipei (TW); Hsien-Cheng Yen, Taipei (TW)

(73) Assignee: Conary Enterprise Co., Ltd., Taipei (TW)

( * ) Notice: Subject to any disclaimer, the term of this patent is extended or adjusted under 35 U.S.C. 154(b) by 499 days.

(21) Appl. No.: 14/591,088

(22) Filed: Jan. 7, 2015

(65) Prior Publication Data

US 2016/0195609 A1 Jul. 7, 2016

(51) Int. Cl.
*G01C 3/08* (2006.01)
*G01S 7/481* (2006.01)
*G01S 17/42* (2006.01)
*G01S 17/02* (2006.01)
*G01S 17/08* (2006.01)
*G01S 7/48* (2006.01)

(52) U.S. Cl.
CPC .......... *G01S 7/4814* (2013.01); *G01S 7/4813* (2013.01); *G01S 17/023* (2013.01); *G01S 17/08* (2013.01); *G01S 17/42* (2013.01); *G01S 7/4808* (2013.01)

(58) Field of Classification Search
CPC ........ G01S 17/023; G01S 17/08; G01S 17/42; G01S 7/4813; G01S 7/4814; G01S 7/4808

USPC ....................................................... 356/4.01
See application file for complete search history.

(56) References Cited

U.S. PATENT DOCUMENTS

| 2008/0266541 | A1* | 10/2008 | Yung | G01S 7/4813 |
| | | | | 356/4.01 |
| 2013/0271744 | A1* | 10/2013 | Miller | G01C 3/08 |
| | | | | 356/4.01 |
| 2013/0335559 | A1* | 12/2013 | Van Toorenburg | G01C 3/08 |
| | | | | 348/135 |
| 2014/0240689 | A1* | 8/2014 | Arbouzov | G01S 17/023 |
| | | | | 356/4.01 |

\* cited by examiner

*Primary Examiner* — Mark Hellner
(74) *Attorney, Agent, or Firm* — Rosenberg, Klein & Lee

(57) ABSTRACT

A method for measuring distance and areas by mobile devices combined with light beam projectors that combines a mobile device with a light beam projector which projects the light beams in the direction identical to the one of the image retrieved from a photodetector module of the mobile device, so as to project a first measuring point and a second measuring point and produce a first distance and a second distance, and then calculate the moving coordinates of the first and second measuring points with a first azimuth data and a second azimuth date detected by an azimuth sensor of the mobile device. Thus the method would be able to calculate the coordinate distance between the first and second measuring points, even the area surrounded by the coordinate distance, the first distance, and the second distance. In other words, the method can calculate the coordinate distance between any two points and the measure of the area surrounded thereby, achieving a convenient and augmented effectiveness in the measuring process.

9 Claims, 13 Drawing Sheets

METHOD FOR MEASURING DISTANCE AND AREAS BY MOBILE DEVICES COMBINED WITH LIGHT BEAM PROJECTORS

BACKGROUND OF THE INVENTION

1. Field of the Invention

The present invention relates to a method for measuring distance and areas by mobile devices combined with light beam projectors, especially to one that can conveniently calculate the distance between two points and that can further calculate the measure of areas, achieving a convenient and augmented effectiveness in the measuring process.

2. Description of the Related Art

FIGS. 1~4 illustrated a distance measurement system and method disclosed in Taiwan Publication No. I289196. It calculates the actual distance between the target object and the image capturing device based on the proportional relationship of the pixel values and the actual length of distance from the target object. FIG. 1 is a functional block diagram thereof. There is a laser light source 20 projecting a laser beam on the surface of the target object 30 and a digital camera 10 retrieving image information, then a computing unit 40 calculating the pixel values of the image so as to detects the actual length of the target object 30 or the distance between which and the digital camera 10 with the proportional relationship between the pixel values and the distance from the target object 30.

FIG. 2 is a schematic diagram illustrating the distance measuring by the pixel values according to the system and method. The digital camera 10 individually retrieves image information on the line CD and EF with the laser source 20 individually projecting a point thereon, where OP denotes the optical point of origin of the digital camera 10;

$P_D$ and $P_F$ denote the projected points on the plane CD and EF respectively projected by the laser light source 20;

O denotes the center of the scanned plane captured by the digital camera 10;

$H_D$ denotes the distance between the plane CD and the digital camera 10;

$H_F$ denotes the distance between the plane EF and the digital camera 10;

$h_S$ denotes the distance between the point OP and the digital camera 10;

$D_D$ and $D_F$ denote the maximal values of the length that can be captured on the plane CD and EF respectively by the digital camera 10;

$D_r$ denotes the distance between $P_D$, $P_F$ and O:

$2\theta_{max}$ denotes the maximal angle for the digital camera 10 to capture;

$N_{max}$ denotes the maximal pixel values of a single scanning line of the digital camera 10; and $N_D$ and $N_F$ denote the pixel values of the distance between $P_D$, $P_F$ and O respectively.

Referring to the projected perspective view of an image retrieved by the digital camera 10 as shown in FIG. 3, the axle Z is the direction of image retrieving of the optical point of origin OP along which the digital camera 10 retrieves the image and the image information of scanned plane including a point A and point B. The direction of the axle Z is also the direction of the normal line of the scanned plane, and the point on the scanned plane passed through by the axle Z is the center of the plane O. The line between point C and D and the line between point E and F are the scanned lines crossed by the point O and a scanned plane; each crossing point on the lines is right at the position of the $$\frac{1}{2}N_{max}$$

pixel point.

Referring to FIG. 2 again, the laser beam projected by the laser light source 20 is parallel to the direction of the image retrieved by the digital camera 10, resulting in the laser beam being perpendicular to any plane scanned by the digital camera 10 and resulting in the projected points $P_D$, $P_F$ projected by the laser beam on the scanned planes having the same length of distance $D_r$ between each point and the point O on the planes.

With the feature of having the same length of distance $D_r$ between each projected points $P_D$, $P_F$ and the point O on the planes, it is able to obtain a horizontal distance $D_r$ by a single laser light source projecting on any plane instead of two laser light sources. In addition, the time for scanning the image information captured by the digital camera 10 and the actual distance between the digital camera 10 and the target object have a linear proportion relation, thus the computing unit 40 can present the distance with the pixel values in the following formulas:

$$D_D = \frac{N_{max}}{N_D} \times D_r \text{ and } D_F = \frac{N_{max}}{N_F} \times D_r;$$

On the other hand, the following formulas come from the Triangle Theorem:

$$H_D = \frac{1}{2}D_D \cot\theta_{max} - h_s \text{ and } H_F = \frac{1}{2}D_F \cot\theta_{max} - h_s;$$

Then we can infer the following formulas from the one above:

$$H_D = \frac{1}{2}\left(\frac{N_s(\max)}{N_D} \times D_r\right)\cot\theta_{max} - h_s \text{ and}$$

$$H_F = \frac{1}{2}\left(\frac{N_s(\max)}{N_F} \times D_r\right)\cot\theta_{max} - h_s.$$

The cot $\theta_{max}$ and $h_s$ in the inferred formulas can be calculated in advance by a calculation model, and then the computing unit 40 is able to find the values of $N_D$ and $N_F$, and further the ones of $H_D$ and $H_F$ with the formulas.

In FIG. 4, a structure diagram of a calculation model for calculating parameter values according to the prior art, the calculation model includes the digital camera 10, two vertical rulers 41, and two horizontal rulers 43; the perpendicular distance $h_{m1}$, $h_{m2}$ between each horizontal rulers 43 and the surface of the digital camera 10 can be measured by the vertical rulers 41. The maximal angle $2\theta_{max}$ to be captured by the digital camera 10 is restricted to $2\theta_s$ for the accuracy of the measurement of $h_s$ in the calculation model; in this way, the edges of the scanned plane would be eliminated in case of blur edges.

Furthermore, when the maximal angle is restricted to $2\theta_s$, the maximal horizontal distances $D_{m1}$, $D_{m2}$ for the digital camera 10 to capture can also be easily measured and calculated by the Triangle Theorem with the following formulas:

$$h_s + h_{m1} = \frac{1}{2} D_{m1} \cot\theta_s \text{ and } h_s + h_{m2} = \frac{1}{2} D_{m2} \cot\theta_s.$$

Then we can infer the formula for the value of cot $\theta_s$ as following.

$$h_{m1} - h_{m2} = \frac{1}{2}(D_{m1} - D_{m2})\cot\theta_s$$

$$\cot\theta_s = 2\frac{h_{m2} - h_{m1}}{D_{m2} - D_{m1}}$$

Then we can further infer the following proportion relation by comparing the formulas above with angle $\theta_s$ and $2\theta_{max}$.

$$\frac{h_s + h_{m2}}{h_s + h_{m1}} = \frac{D_{m2}}{D_{m1}}$$

Therefore the value of $h_s$ can be found in the following inferred formula.

$$h_s = \frac{h_{m1}D_{m2} - h_{m2}D_{m1}}{D_{m1} - D_{m2}}$$

Another measurement tool is a laser rangefinder which emits laser beam to the target object and calculates the distance in-between by receiving the laser signals reflected to a laser signal receiver, usually an Avalanche Photo Diode (APD), that turns the laser signals into electric signals. The equation of the calculation is $$Td = 2\frac{L}{C}$$

where Td denotes the delayed period between sending and receiving the signals; L denotes the distance between the origin of measurement and the target object; C denotes the velocity of light transmission. Therefore, measuring the delayed period Td leads to the distance L by calculation.

As technologies getting advanced, laser rangefinders are widely applied in construction engineering, decoration engineering, etc. As shown in FIG. 5, a laser rangefinder 100 is used to measure the table 101. If the table 101 is placed along the wall, the signals would reflect by the wall and then we can find the length of distance L.

However, there is still room for improvements. Firstly, the measurer should be at a fixed position to project the laser beam to the pre-determined measuring point instead of any measuring point in the space, making the measurement inconvenient. Secondly, since the laser beam is projected to the pre-determined measuring point, it can only calculate the distance but not the measure of the area surrounded by any measuring point and the point of the origin.

SUMMARY OF THE INVENTION

It is a primary object of the present invention to provide a method for measuring distance and areas by mobile devices combined with light beam projectors that can calculate the distance between any two points projected by the light beam projector in the mobile device, so as to overcome the inability to process the calculation in the prior art and achieve a convenient effectiveness in the distance measuring process.

Another object of the present invention is to provide a method for measuring distance and areas by mobile devices combined with light beam projectors that can calculate the distance between any two points projected by the light beam projector in the mobile device and the distances between the projector as the point of the origin and the projected points, so as to calculate the measure of area surrounded by the distances and to overcome the inability to process the calculation of areas in the prior art and achieve an augmented effectiveness in the distance measuring process.

In order to achieve the objects above, the present invention comprises the following steps: a) providing a mobile device having at least one MCU, a memory, a photodetector module, and an azimuth sensor, and said MCU being electrically connected to the memory, the photodetector module, and the azimuth sensor separately; b) providing a light beam projector electrically linked up with said mobile device to be driven by, and the direction of the light beam projected by the light beam projector being identical with the direction of the image retrieved by the photodetector module; c) setting up the connections between the memory, the photodetector module, the azimuth sensor and the light beam projector by the MCU so that when the connection being activated, the azimuth sensor would initialize and set up the photodetector module as being at the point of the origin; d) turning the photodetector module and linking up the light beam projector for the azimuth sensor to produce a first azimuth data, and then activating the photodetector module to retrieve a first image information after the light beam being projected to a first measuring point in the space; a first distance between the first measuring point and the photodetector module being calculated by the MCU, and a moving coordinate of the first measuring point being calculated by the MCU with the first distance and the first azimuth data, then the first distance and the moving coordinates of the first measuring point being stored in said memory; e) turning again the photodetector module and linking up the light beam projector for the azimuth sensor to produce a second azimuth data, and then activating the photodetector module to retrieve a second image information after the light beam being projected to a second measuring point in the space; a second distance between the second measuring point and the photodetector module being calculated by the MCU, and a moving coordinates of the second measuring point being calculated by the MCU with the second distance and the second azimuth data, then the second distance and the moving coordinates of the second measuring point being stored in said memory; and f) accessing the moving coordinates of the first measuring point and the second measuring point by the MCU and calculating the coordinate distance between the first measuring point and the second measuring point.

Moreover, the process may further includes a step g) storing the coordinate distance between the first measuring point and the second measuring point in the memory and accessing it to calculate the area surrounded by said coordinate distance, the first distance and the second distance by the MCU.

In the process mentioned above, the mobile device includes a display module electrically connected to the MCU and an application program stored in the memory and written with the steps c)~g); the mobile devices can handle the display module to operate the MCU and access the application program so that the display module would display a measurement list of coordinate distance and areas.

Furthermore, the photodetector module comprises either a camera module or an avalanche photodiode; the mobile device comprises either a smart phone, a tablet PC, or a rangefinder; and the light beam projector comprises a connecting plug having a PCB with an electrically connecting element arranged at the front end thereof, a light emitting module arranged aside the PCB, a driving circuit coupled to the PCB and the light emitting module and disposed in-between, and a casing wrapping the PCB and the light emitting module; the electrically connecting element being designed to match the specifications of a transmission port or an audio jack of the mobile device, in order to be inserted in for accessing the electricity and signals and being exposed at the inner side of the casing; and a light emitting hole being arranged on a surface of the periphery of the casing for the light emitting module to project the lights.

Additionally, the light emitting module includes a hollow tube, a luminous element being arranged inside the hollow tube and having a plurality of pins at the bottom thereof, and an optical lens arranged inside the hollow tube ahead of the luminous element; the luminous element comprises either a laser diode or a LED, and the LED comprises either a Visible LED or an Infrared LED. The driving circuit can be disposed on the PCB or the light emitting module.

With structures stated above, the light emitting module can be arranged in the same direction or in the perpendicular direction with the connecting plug, and the light emitting hole is arranged in a L shape, at the corner thereof a reflector with 45° incline is arranged for the lights to be refracted to a pre-determined direction.

In summation, the present invention can measure the moving coordinates of the first and second measuring points individually by calculating the first and second distance and the first and second azimuth data respectively and further calculate the coordinate distance between the first and second measuring points with the structures disclosed above. In addition, the method can also calculate the area surrounded by the coordinate distances, the first distance and the second distance, featuring a convenient and augmented effectiveness in the measuring process.

DETAILED DESCRIPTION OF THE PREFERRED EMBODIMENT

Figure 1:
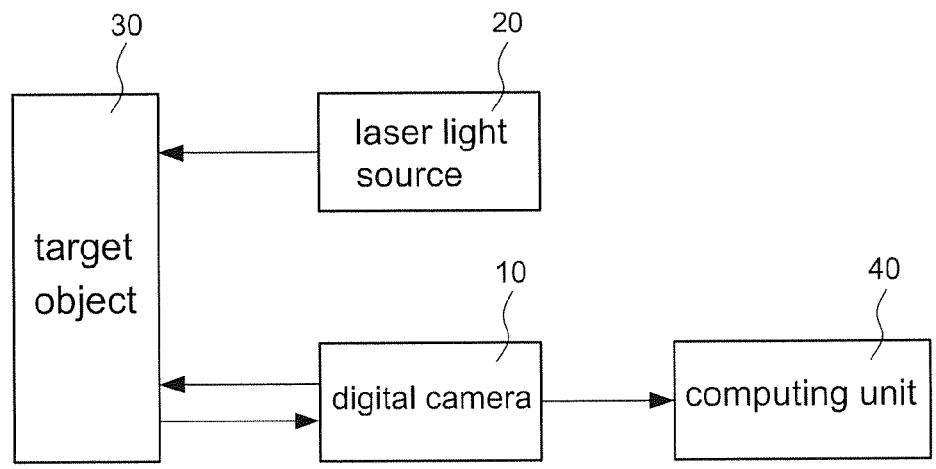
FIG. 1 is a functional block diagram according to the prior art.
Figure 2:
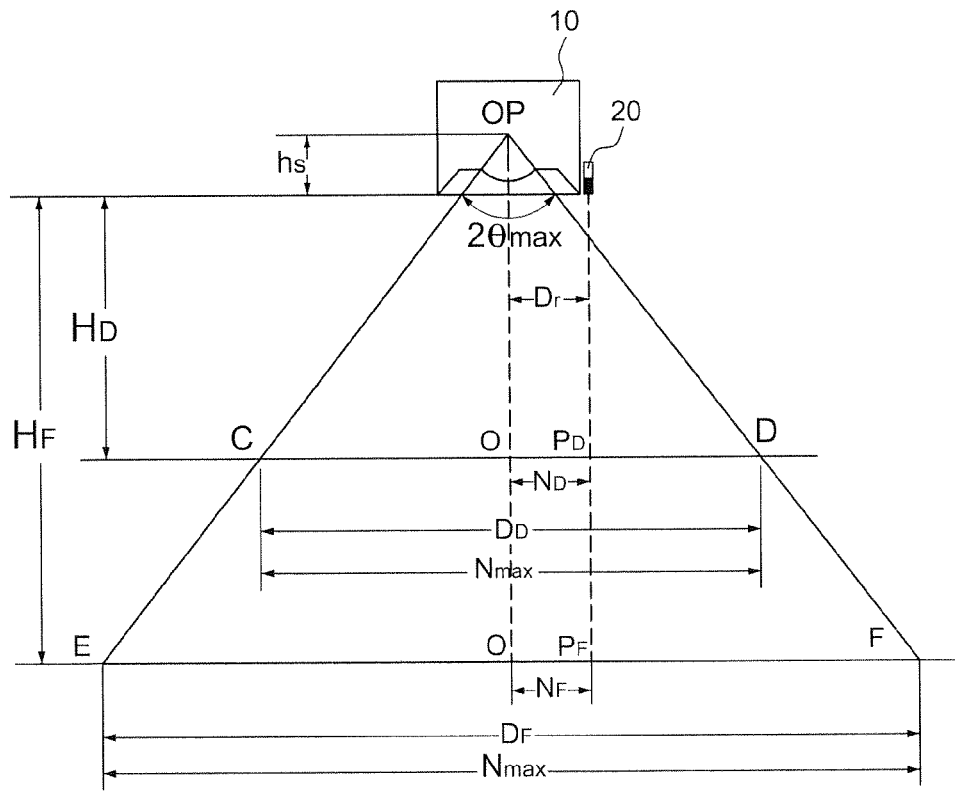
FIG. 2 is a schematic diagram illustrating the distance measuring by the pixel values according to the prior art.
Figure 3:
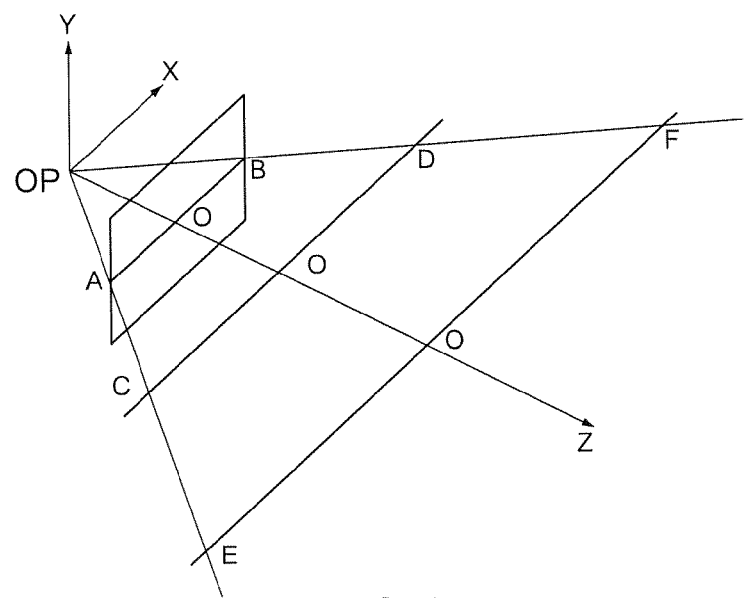
FIG. 3 is a projected perspective view of an image retrieved by a digital camera according to the prior art.
Figure 4:
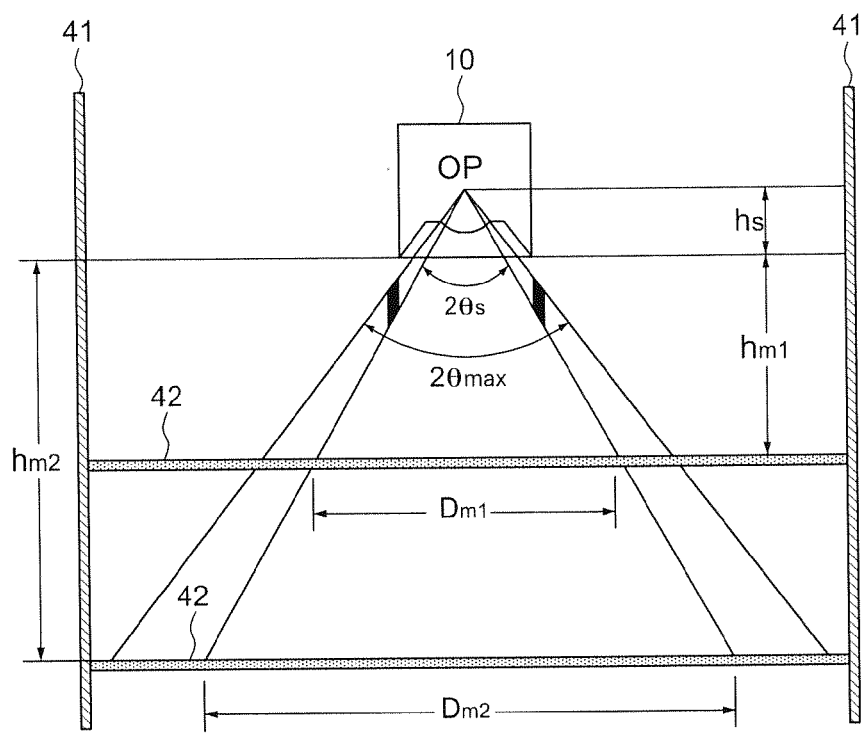
FIG. 4 is a structure diagram of a calculation model for calculating the parameter values according to the prior art.
Figure 5:
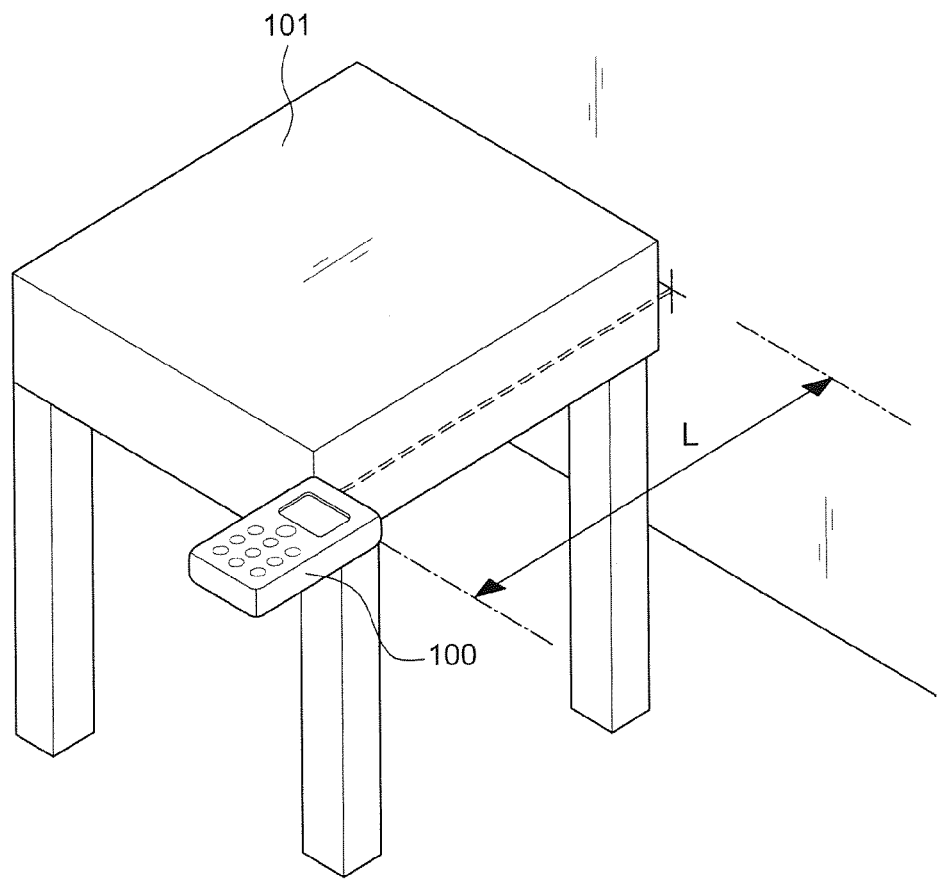
FIG. 5 is an application example of a rangefinder according to the prior art.
Figure 6:
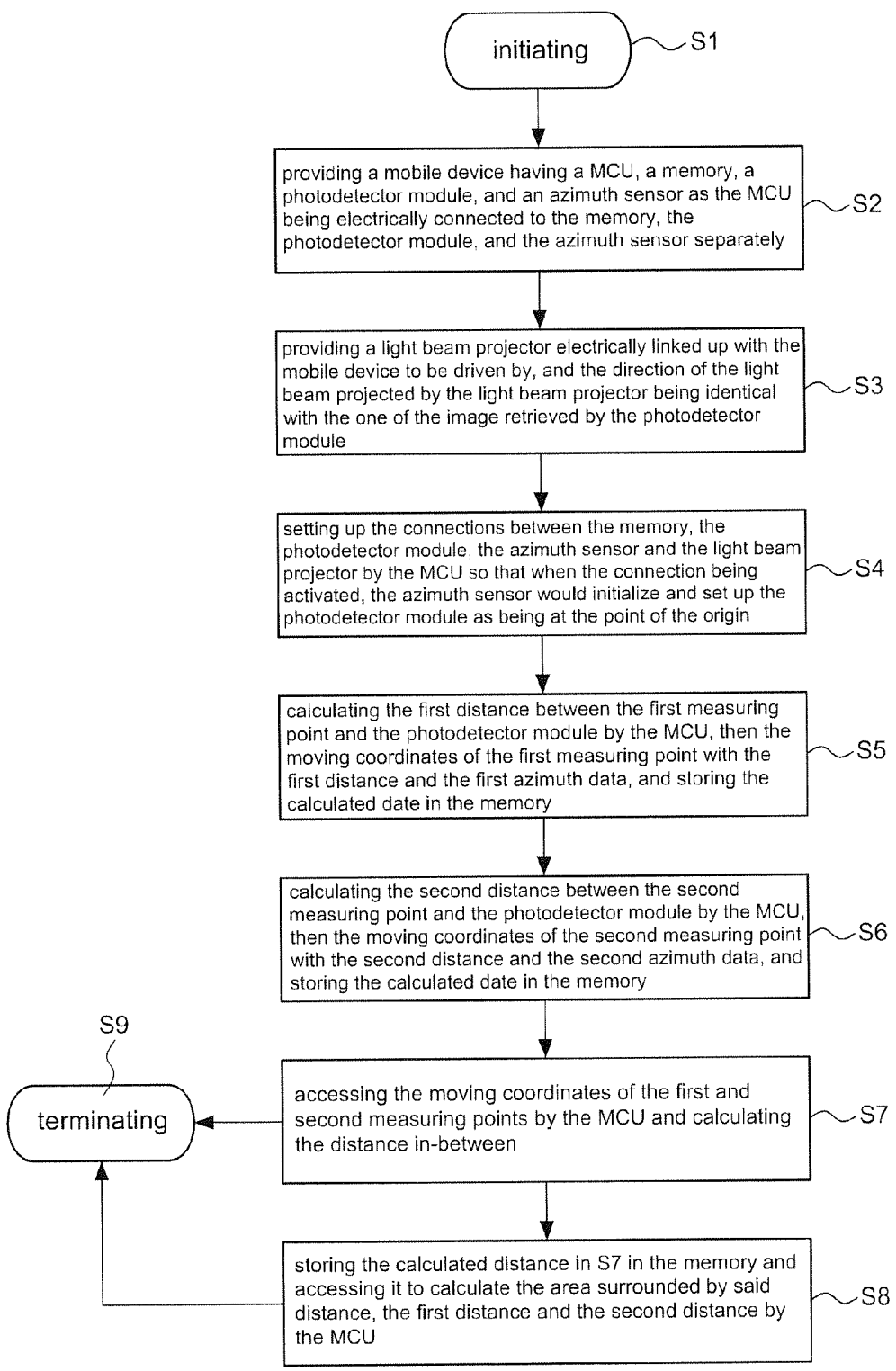
FIG. 6 is a flow diagram of the present invention.

Referring to the flow diagram in FIG. 6 with coordination of FIGS. 6~13B, in a preferred embodiment, the present invention includes steps S1~S9 as following. Step 1 S1: initiating the process. Step 2 S2: a) providing a mobile device 50 having at least one MCU 51, a memory 52, a photodetector module 53, and an azimuth sensor 54; the MCU 51 is electrically connected to the memory 52, the photodetector module 53, and the azimuth sensor 54 separately.

Figure 7:
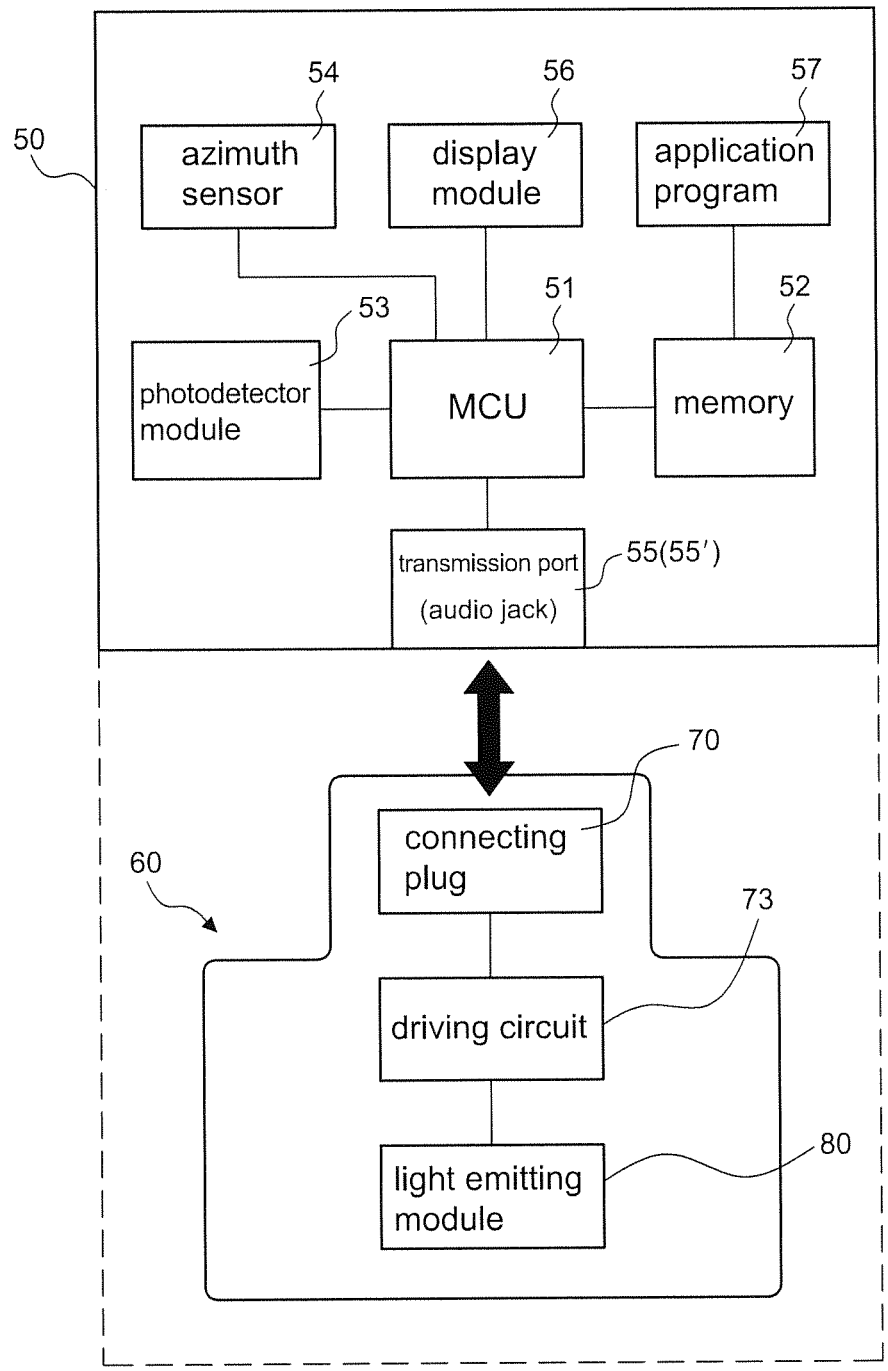
FIG. 7 is a block diagram illustrating the combination of the mobile device and the light beam projector in the present invention.

The photodetector module 53 comprises either a camera module or an avalanche photodiode (APD). Basically it detects the distance between the observer (e.g. position O) and a pre-determined point in the space (e.g. position A) by the principles of the photodetector; such function can be easily achieved in the prior art. The mobile device 50 comprises either a smart phone, a tablet PC, or a rangefinder; such devices have construction of a photodetector module 53. In the following embodiment, the present invention has a smart phone as the mobile device 50 for illustration, but certainly the present invention is not limited to such application. Referring to FIG. 7, in this embodiment the mobile device 50 is a smart phone which has a transmission port 55 and an audio jack 55' electrically connected to the MCU 51 individually.

Figure 8A:
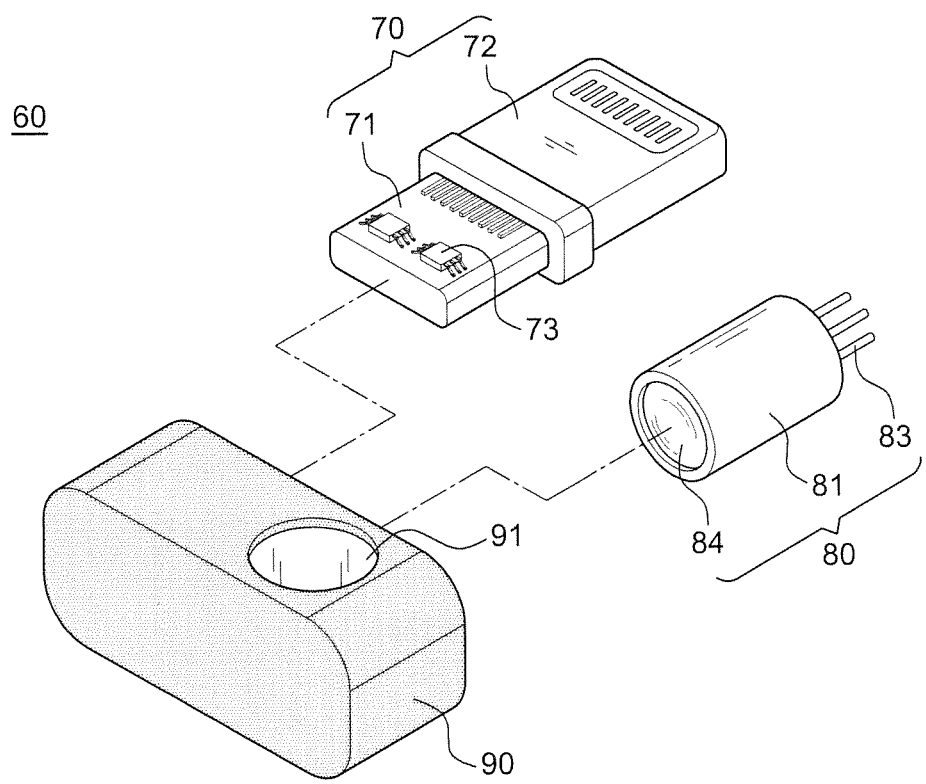
FIG. 8A is an exploded view of the light beam projector in the present invention.
Figure 8B:
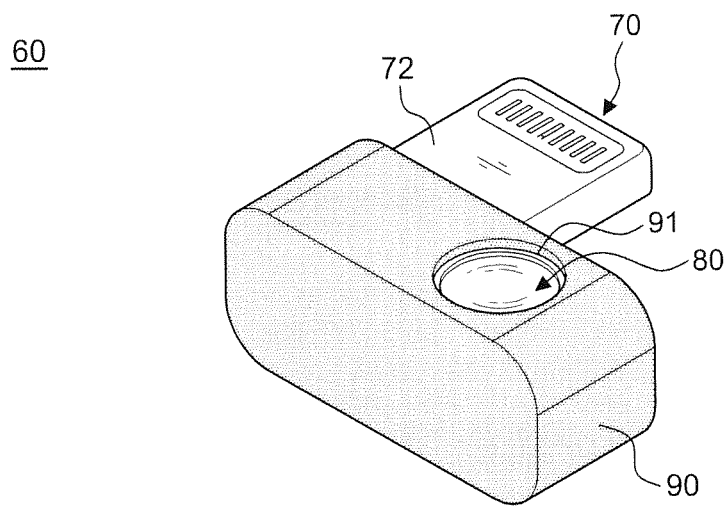
FIG. 8B is a perspective view of the assembled light beam projector in the present invention.

S3: b) providing a light beam projector 60 electrically linked up with the mobile device 50 to be driven by, and the direction of the light beam projected by the light beam projector 60 being identical with the direction of the image retrieved by the photodetector module 53. The light beam projector 60 can be disposed inside or outside the mobile device 50 as shown in FIGS. 8A and 8B. The light beam projector 60 comprises a connecting plug 70 having a PCB 71 with an electrically connecting element 72 arranged at the front end thereof, a light emitting module 80 arranged aside the PCB 71, a driving circuit 73 coupled to the PCB 71 and the light emitting module 80 and disposed in-between, and a casing 90 wrapping the PCB 71 and the light emitting module 80. The electrically connecting element 72 is designed to match the specifications of the transmission port 55 and the audio jack 55' of the mobile device 50, in order to be inserted in for accessing the electricity and signals. A light emitting hole 91 is arranged on a surface of the periphery of the casing 90 for the light emitting module 80 to project the lights. Besides, the driving circuit 73 can be disposed either on the PCB 71 or inside the light emitting module 70.

Figure 9A:
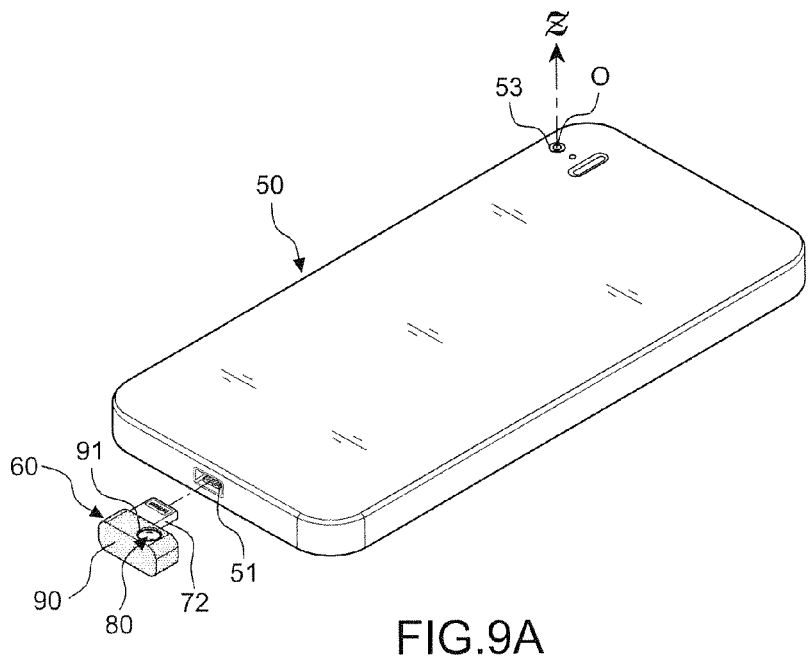
FIG. 9A is an exploded view of the light beam projector and the mobile device before the combination in the present invention.
Figure 9B:
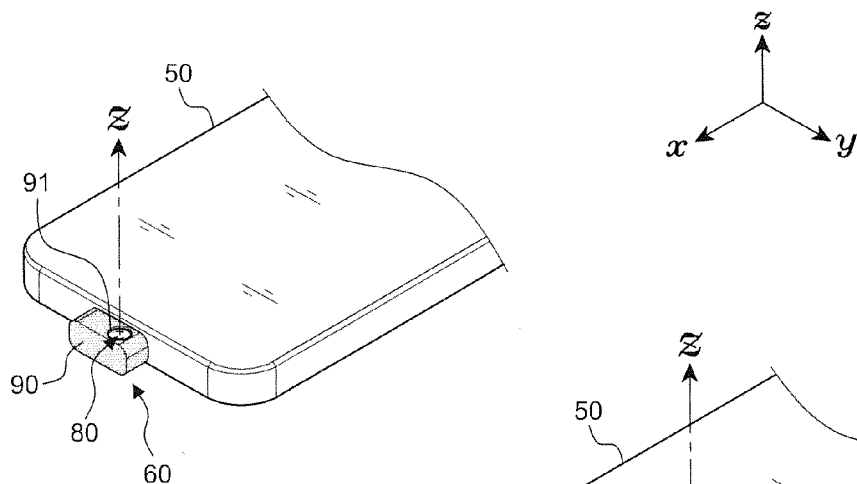
FIG. 9B is a perspective view of the light beam projector and the mobile device after the combination in the present invention.
Figure 9C:
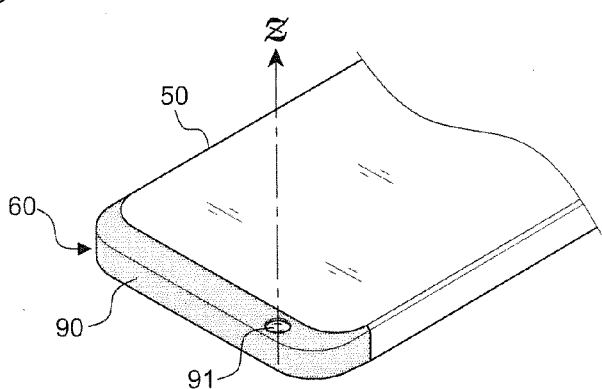
FIG. 9C is a perspective view of the combined light beam projector and mobile device in a matching form in the present invention.
Figure 10A:
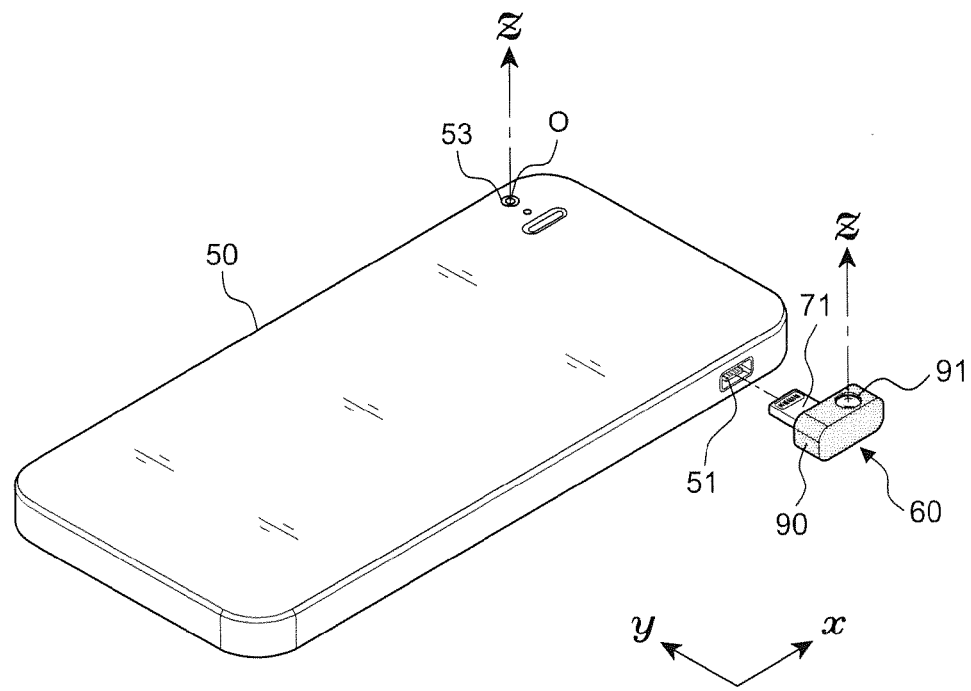
FIG. 10A is another exploded view of the light beam projector and the mobile device before the combination in the present invention.
Figure 10B:
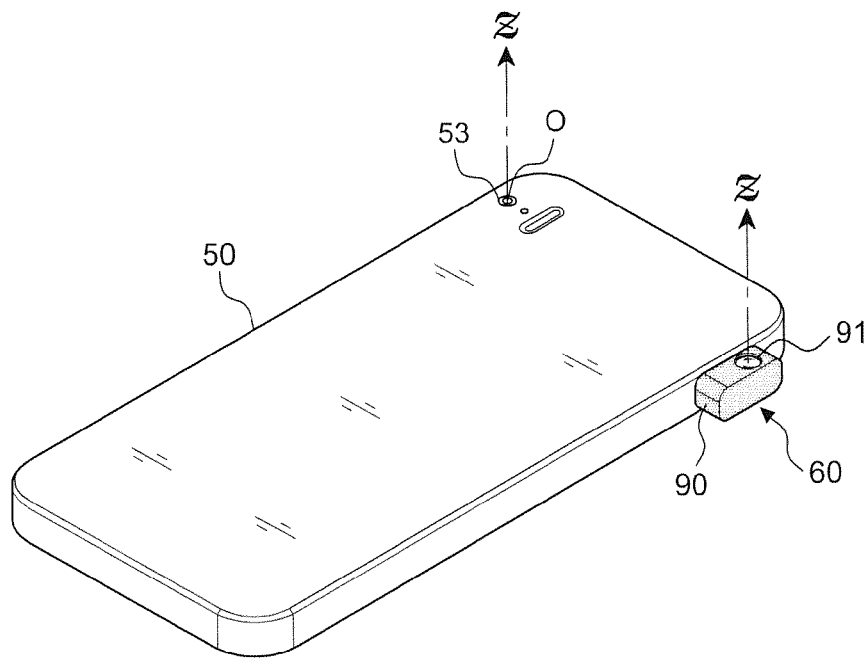
FIG. 10B is another perspective view of the light beam projector and the mobile device after the combination in the present invention.

Furthermore, in a preferred embodiment, the transmission port 55 is arranged at the rear of the smart phone for the light beam projector 60 to link up as illustrated in FIGS. 9A, 9B, and 9C. In another preferred embodiment, the transmission port 55 is arranged aside the smart phone for the light beam projector 60 to link up as illustrated in FIGS. 10A and 10B. From the disclosed embodiments it is concluded that the light beam projector 60 can be applied to the transmission port 55 of any smart phone. Also, the mobile device 50 can be a table PC or a rangefinder other than a smart phone, as stated before. Hence, the light beam projector 60 can not only link up to the transmission port 55 and the audio jack 55' on the smart phone; as an electrically connected interface, it can link up to every transmission port on a tablet PC or a rangefinder. Or having the light beam projector 60 built inside the mobile device 50 is also applicable.

Figure 11A:
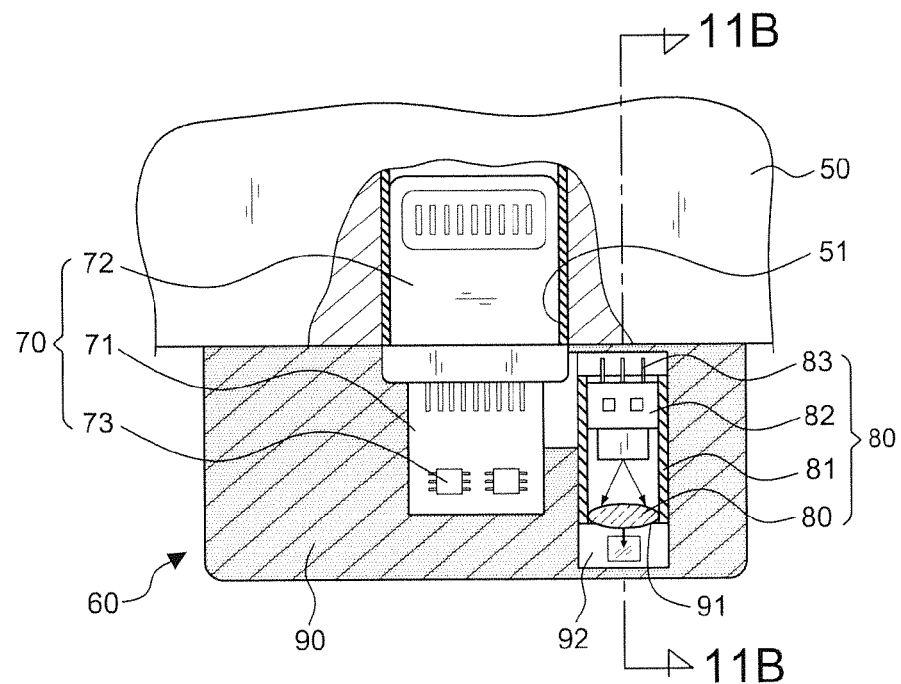
FIG. 11A is a partially sectional view of the light emitting module arranged in the same direction as the one of the connecting plug.
Figure 11B:
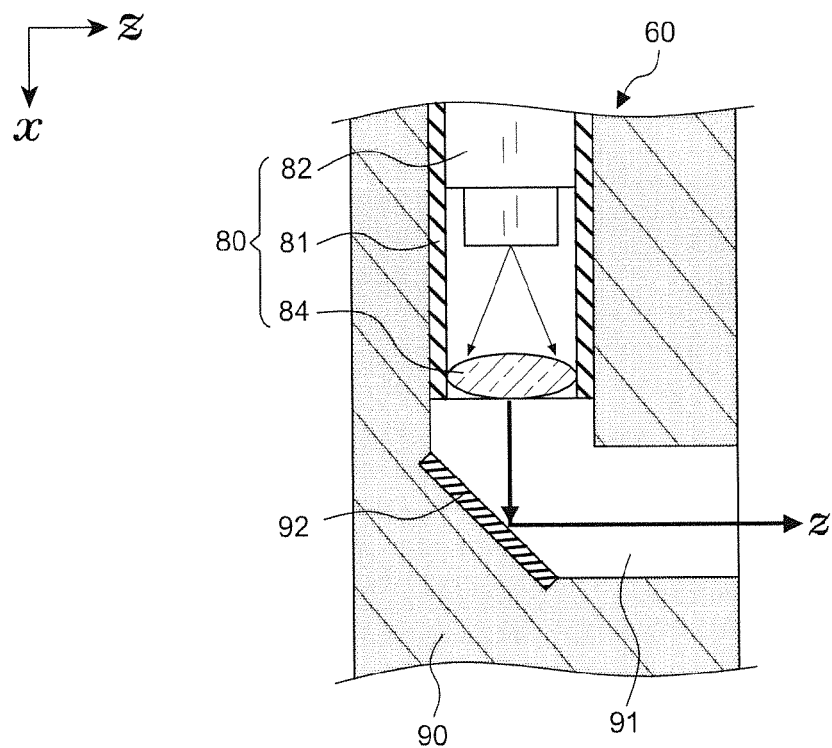
FIG. 11B is a cross-section view along line 11B-11B in FIG. 11A.
Figure 11C:
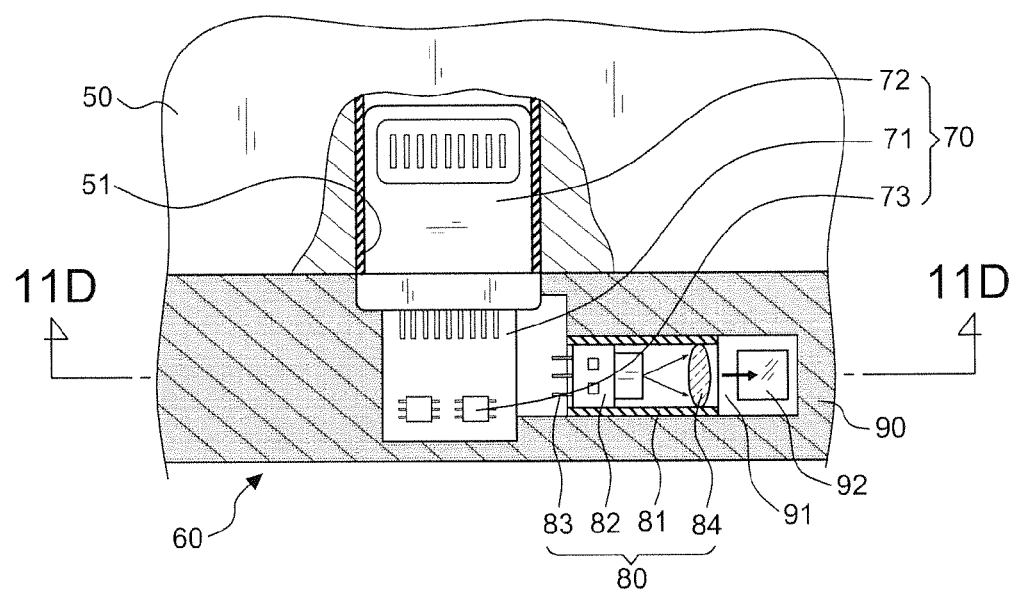
FIG. 11C is a partially sectional view of the light emitting module arranged in a perpendicular direction to the one of the connecting plug.
Figure 11D:
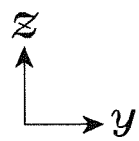
FIG. 11D is a cross-section view along line 11D-11D in FIG. 11C.
Figure 11D:
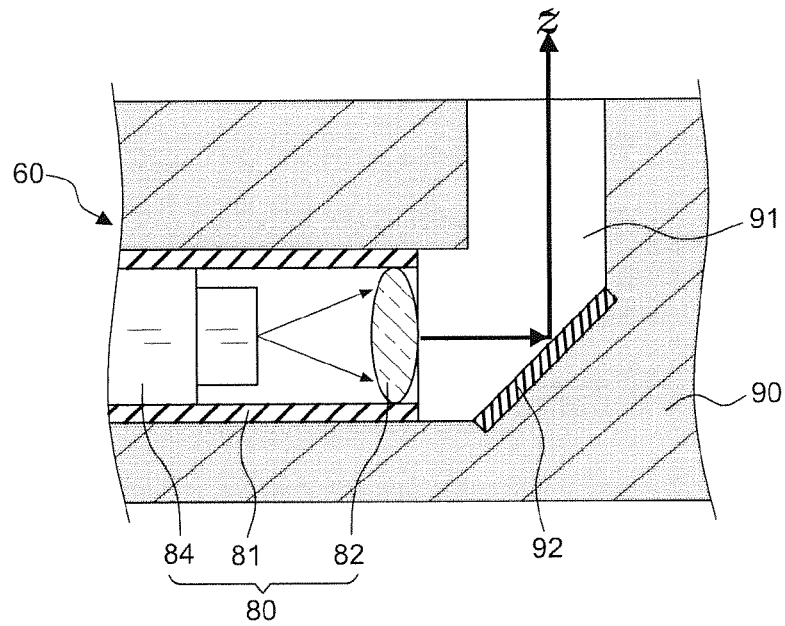

With reference to FIGS. 11A~11D, the light emitting module 80 includes a hollow tube 81, a luminous element 82 being arranged inside the hollow tube 81 and having a plurality of pins 83 at the bottom thereof, and an optical lens 84 arranged inside the hollow tube 81 ahead of the luminous element 82. The luminous element 82 comprises either a laser diode or a LED, and the LED comprises either a Visible LED or an Infrared LED. In this embodiment, the light emitting module 80 can be arranged in the same direction with the connecting plug 70 as shown in FIG. 11A, or it may be in a perpendicular direction with the connecting plug 70 as shown in FIG. 11B. In addition, referring to FIGS. 11C and 11D, the light emitting hole 91 of the casing 90 is arranged in a L shape; at the corner thereof a reflector 92 with 45° incline is arranged for the lights to be refracted to a pre-determined direction.

Figure 12:
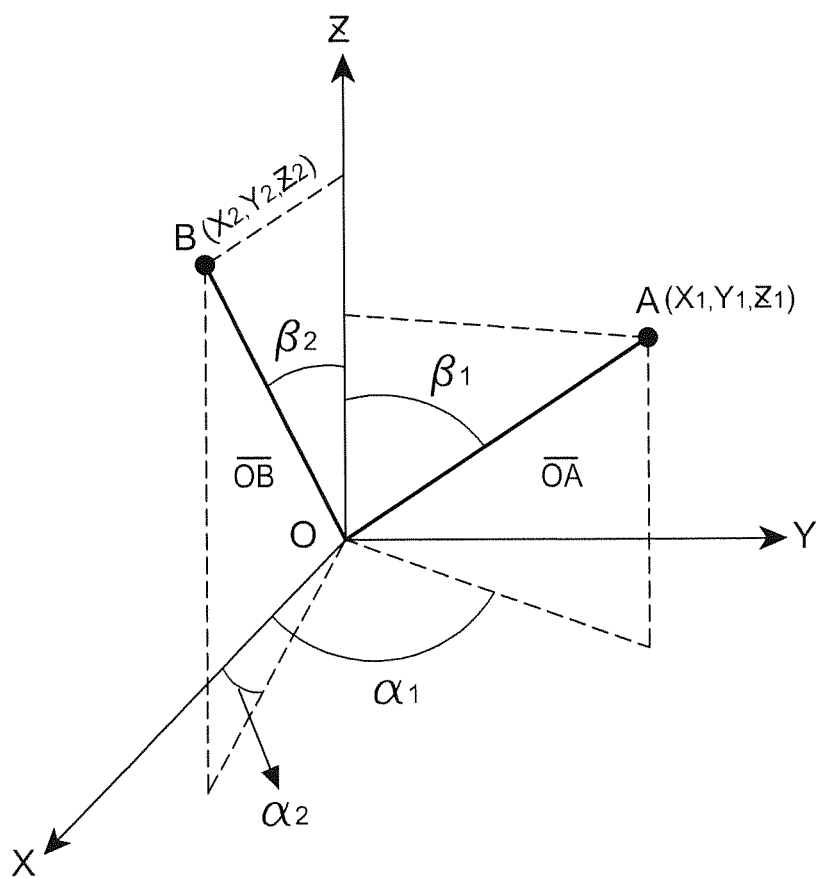
FIG. 12 is an application view of the present invention.

With reference to FIG. 12, the next steps are as following. S4: c) setting up the connections between the memory 52, the photodetector module 53, the azimuth sensor 54 and the light beam projector 60 by the MCU 51 so that when the connection is activated, the azimuth sensor 54 would initialize and set up the photodetector module 53 as being at the point of the origin O.

S5: d) turning the photodetector module 53 and linking up the light beam projector 60 for the azimuth sensor 54 to produce a first azimuth data $\alpha_1$, $\beta_1$, and then activating the photodetector module 53 to retrieve a first image information $P_1$ after the light beam being projected to a first measuring point A in the space; a first distance $\overline{OA}$ between the first measuring point A and the photodetector module 53 is calculated by the MCU 51, and a moving coordinates $X_1$, $Y_1$, $Z_1$ of the first measuring point is calculated by the MCU 51 with the first distance and the first azimuth data $\alpha_1$, $\beta_1$ with the formulas below:

$$X_1 = \overline{OA} \times \sin(\beta_1) \times \cos(\alpha_1);$$

$$Y_1 = \overline{OA} \times \sin(\beta_1) \times \sin(\alpha_1); \text{ and}$$

$$Z_1 = \overline{OA} \times \cos(\beta_1).$$

Then the first distance $\overline{OA}$ and the moving coordinates $X_1$, $Y_1$, $Z_1$ of the first measuring point A are stored in the memory 52.

S6: e) turning again the photodetector module 53 and linking up the light beam projector 60 for the azimuth sensor 54 to produce a second azimuth data $\alpha_2$, $\beta_2$, and then activating the photodetector module 53 to retrieve a second image information $P_2$ after the light beam being projected to a second measuring point B in the space; a second distance $\overline{OB}$ between the second measuring point B and the photodetector module 53 is calculated by the MCU 51, and a moving coordinates $X_2$, $Y_2$, $Z_2$ of the second measuring point B is calculated by the MCU 51 with the second distance $\overline{OB}$ and the second azimuth data $\alpha_2$, $\beta_2$ with the formulas below:

$$X_2 = \overline{OB} \times \sin(\beta_2) \lambda \cos(\alpha_2);$$

$$Y_2 = \overline{OB} \times \sin(\beta_2) \times \sin(\alpha_2); \text{ and}$$

$$Z_2 = \overline{OB} \times \cos(\beta_2).$$

Then the second distance $\overline{OB}$ and the moving coordinates $X_2$, $Y_2$, $Z_2$ of the second measuring point B are stored in the memory 52.

S7: f) accessing the moving coordinates $X_1$, $Y_1$, $Z_1$ and $X_2$, $Y_2$, $Z_2$ of the first measuring point A and the second measuring point B by the MCU 52 and calculating the coordinate distance $\overline{AB}$ between the first measuring point and the second measuring point with the formula $\overline{AB} = \sqrt{(X_1-X_2)^2 + (Y_1-Y_2)^2 + (Z_1-Z_2)^2}$. Then the next step would be S9: terminating.

The present invention may further include a S8: g) storing the coordinate distance $\overline{AB}$ between the first measuring point A and the second measuring point B in the memory 52 and accessing it to calculate the area OAB surrounded by said coordinate distance $\overline{AB}$, the first distance $\overline{OA}$ and the second distance $\overline{OB}$ by the MCU 52, and then proceed S9: terminating.

Hence, the mobile device 50 includes a display module 56 electrically connected to the MCU 51 and an application program 57 stored in the memory 52 and written with the steps c)~g) S4~S8; the mobile device 50 can handle the display module 56 to operate the MCU 51 and access the application program 57 so that the display module 56 would display a measurement list M of the coordinate distance $\overline{AB}$ and the area OAB.

Figure 13A:
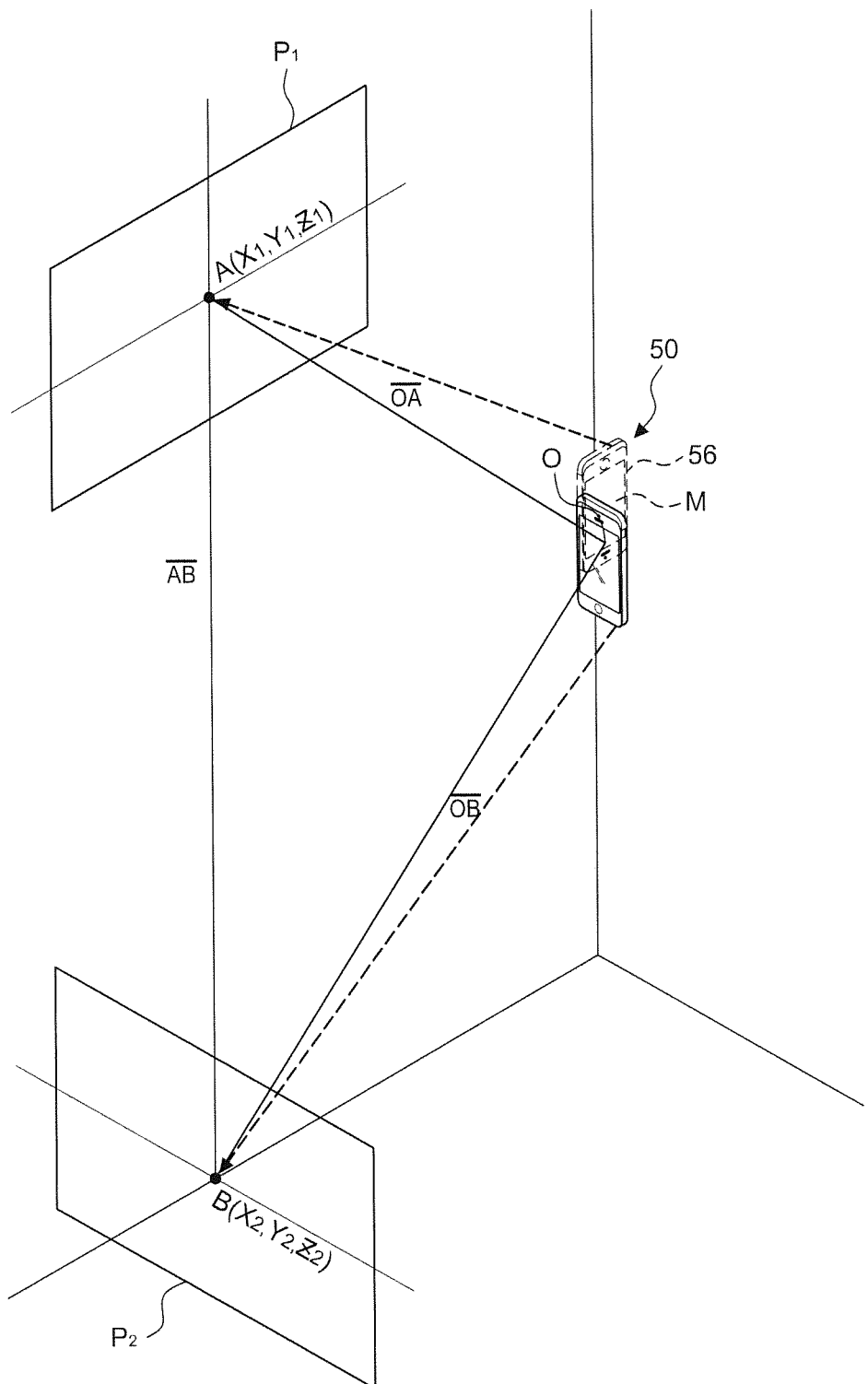
FIG. 13A is a practical application view of a coordinate distance measurement in the present invention.
Figure 13B:
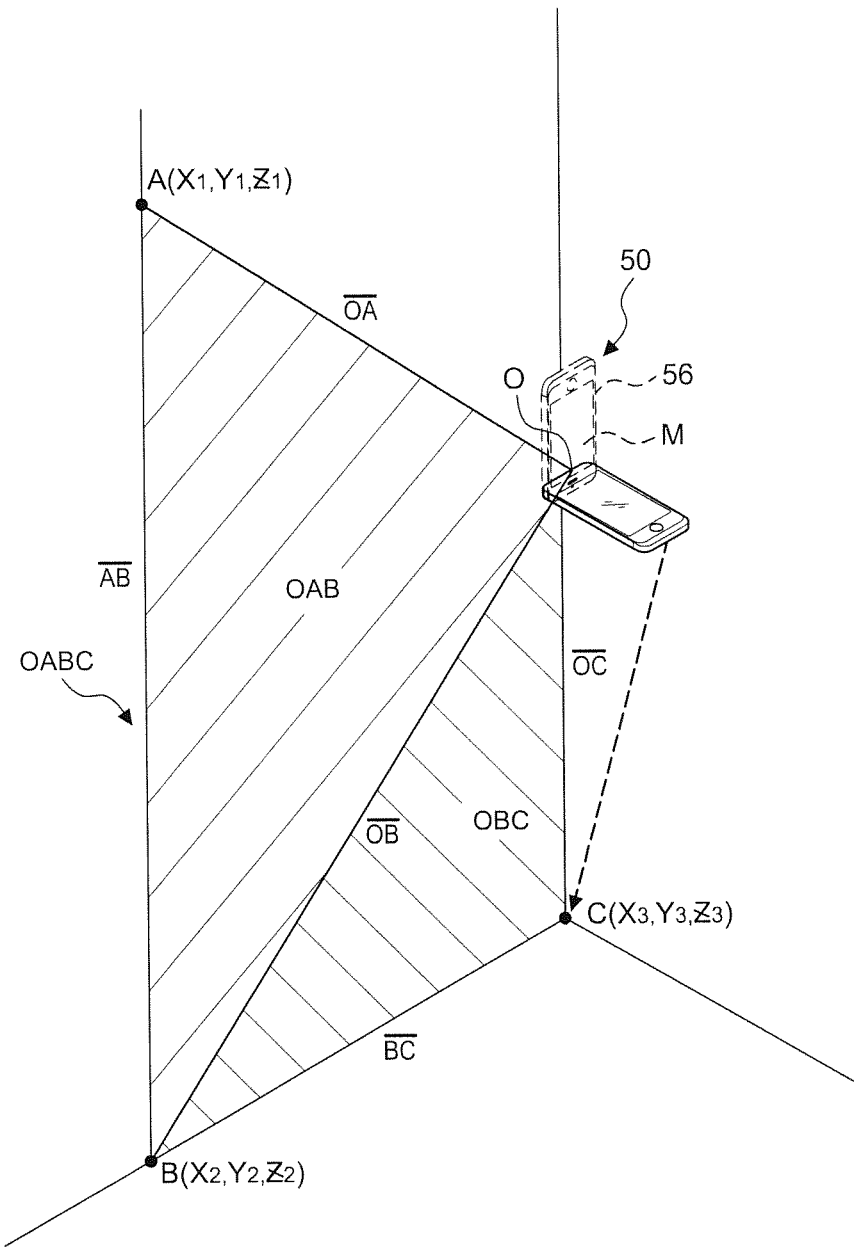
FIG. 13B is a practical application view of an area measurement in the present invention.

Referring to FIG. 13A, after the coordinate distance $\overline{AB}$ of the measurement list M is selected, the first and second measuring points A, B would be randomly projected in the space and the coordinate distance $\overline{AB}$ can be easily calculated. Further referring to FIG. 13B, after the area OAB of the measurement list M is selected, the first and second measuring points A, B would be randomly projected in the space to produce the distances $\overline{AB}$, $\overline{OA}$, and $\overline{OB}$ for calculating the area OAB; Or there can be a third measuring point C randomly projected in the space, then the moving coordinates thereof $X_3$, $Y_3$, $Z_3$ and the coordinate distance $\overline{BC}$ can be calculated, thus producing an area OBC surrounded by the distances $\overline{BC}$, $\overline{OB}$, and $\overline{OC}$ to be calculated, so as to produce a larger area combined with areas OAB and OBC, featuring the present invention an augmented effectiveness Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for measuring distance and areas by mobile devices combined with light beam projectors comprising:
   a) providing a mobile device having at least one MCU, a memory, a photodetector module, and an azimuth sensor, and said MCU being electrically connected to the memory, the photodetector module, and the azimuth sensor separately;
   b) providing a light beam projector electrically linked up and driven by said mobile device, and the direction of the light beam projected by the light beam projector being identical with the direction of the image retrieved by the photodetector module;
   c) setting up the connections between the memory, the photodetector module, the azimuth sensor and the light beam projector by the MCU so that when the connection is activated, the azimuth sensor would initialize and set up the photodetector module as being at the point of the origin;
   d) turning the photodetector module and linking up the light beam projector for the azimuth sensor to produce a first azimuth data, and then activating the photodetector module to retrieve a first image information after the light beam is projected to a first measuring point in the space; a first distance between the first measuring point and the photodetector module being calculated by the MCU, and moving coordinates of the first measuring point being calculated by the MCU with the first distance and the first azimuth data, then the first distance and the moving coordinates of the first measuring point being stored in said memory;
   e) turning again the photodetector module and linking up the light beam projector for the azimuth sensor to produce a second azimuth data, and then activating the photodetector module to retrieve a second image information after the light beam is projected to a second measuring point in the space; a second distance between the second measuring point and the photodetector module being calculated by the MCU, and moving coordinates of the second measuring point being calculated by the MCU with the second distance and the second azimuth data, then storing the second distance and the moving coordinates of the second measuring point in said memory; and
   f) accessing the moving coordinates of the first measuring point and the second measuring point by the MCU and calculating the coordinate distance between the first measuring point and the second measuring point.

2. The method as claimed in claim 1, wherein the method further includes a step g) storing the coordinate distance in the memory and accessing the coordinate distance to calculate the area surrounded by said coordinate distance, the first distance and the second distance by the MCU.

3. The method as claimed in claim 2, wherein the mobile device includes a display module electrically connected to the MCU and an application program stored in the memory and written with the steps c)-g); the mobile device uses the display module to operate in conjunction with the MCU and access the application program so that the display module displays a measurement list of coordinate distance and areas.

4. The method as claimed in claim 1, wherein the mobile device comprises either a smart phone, a tablet PC, or a rangefinder.

5. The method as claimed in claim 1, wherein the photodetector module comprises either a camera module or an avalanche photodiode.

6. The method as claimed in claim 1, wherein the light beam projector comprises a connecting plug having a PCB with an electrically connecting element arranged at the front end thereof, a light emitting module arranged aside the PCB, a driving circuit coupled to the PCB and the light emitting module and disposed therebetween, and a casing surrounding the PCB and the light emitting module; the electrically connecting element being designed to match specifications of a transmission port or an audio jack of the mobile device for insertion therein to access electrical power and signals and thereby being exposed at the inner side of the casing; and a light emitting hole being arranged on a surface of a periphery of the casing for the light emitting module to project the lights.

7. The method as claimed in claim 6, wherein the light emitting module includes a hollow tube, a luminous element being arranged inside the hollow tube and having a plurality of pins at the bottom thereof, and an optical lens arranged inside the hollow tube ahead of the luminous element; the luminous element comprises either a laser diode or a LED, and the LED comprises either a Visible LED or an Infrared LED.

8. The method as claimed in claim 6, wherein the light emitting module can be arranged in the same direction or in a perpendicular direction with the connecting plug.

9. The method as claimed in claim 6, wherein the light emitting hole of the casing is arranged in an L shape, a reflector inclined at 45° is arranged at a corner of the light emitting hole for the lights to be refracted to a pre-determined direction.

* * * * *